United States Patent [19]

Fowler

[11] 4,051,455

[45] Sept. 27, 1977

[54] DOUBLE FLEXURE DISC ELECTRO-ACOUSTIC TRANSDUCER

[75] Inventor: Ralph A. Fowler, Ellicott City, Md.

[73] Assignee: Westinghouse Electric Corporation, Pittsburgh, Pa.

[21] Appl. No.: 634,003

[22] Filed: Nov. 20, 1975

[51] Int. Cl.[2] .................... H04B 13/00

[52] U.S. Cl. .................... 340/9; 310/366; 340/10

[58] Field of Search .................... 340/7-14; 310/9.6, 9.8; 333/72

[56] References Cited

U.S. PATENT DOCUMENTS

| | | | |
|---|---|---|---|
| 2,875,355 | 2/1959 | Peterman | 340/9 X |
| 2,967,956 | 1/1961 | Dranetz et al. | 340/10 X |
| 3,153,156 | 10/1964 | Watlington | 340/10 X |
| 3,351,903 | 11/1967 | Straube | 340/10 |
| 3,457,543 | 7/1969 | Akervold et al. | 340/10 |
| 3,497,731 | 2/1970 | Straube | 340/10 X |
| 3,510,698 | 5/1970 | Massa | 340/10 X |
| 3,513,439 | 5/1970 | Egli | 340/10 |
| 3,832,762 | 9/1974 | Johnston | 340/10 X |

*Primary Examiner*—Harold Tudor

*Attorney, Agent, or Firm*—C. F. Renz; H. W. Patterson

[57] ABSTRACT

Improved low frequency electro-acoustic transducer apparatus of the type employing two piezoelectrically driven flexure discs mounted at the ends of a short cylindrical housing containing an acoustic mismatch fluid, is provided. The piezoelectrically driven flexure discs are constructed as assemblies having a plurality of concentric piezoelectric laminar sandwich units to excite the flexure discs. By individually electrically exciting the concentric sandwich structures through band-pass filters and a selective interconnection network, the flexure discs function with a plurality of resonant frequencies of flexing to provide broad band and efficient operation.

9 Claims, 13 Drawing Figures

DOUBLE FLEXURE DISC ELECTRO-ACOUSTIC TRANSDUCER

CROSS-REFERENCE TO RELATED PATENTS

The present invention is an improvement upon an invention which is the subject of Patent Application Ser. No. 506,658, filed Sept. 16, 1974, entitled "Acoustic Transducer Employing Flexural Disc Transducers". That application and the present application are under assignments to a common assignee.

BACKGROUND OF THE INVENTION

1. Field of the Invention

The present invention relates to improvements in compact, low frequency underwater electro-acoustical transducers which employ the advantage of the low resonant frequencies of the flexural modes of the discs, and more particularly to apparatus of a type in which two piezoelectrically excited discs are mounted at opposite ends of a fluid-tight chamber with a fluid medium contained in the chamber having an acoustical mismatch relative to the discs so that radiation from the inner faces of the discs is minimized.

2. Description of the Prior Art

Transducer apparatus of the type referred to has been described, and the theory thereof discussed in a U.S. Navy Underwater Sound Laboratory Research Report No. 490 "Theory of the Piezoelectric Flexural Disk Transducer with Application to Underwater Sound", by Ralph S. Woollett (Armed Services Technical Information Agency Catalog No. 249,731). The apparatus employing two flexure discs is particularly described therein at pages 58–60, and page 63 (where a short treatment of an embodiment using a continuous trilaminar disc is briefly described). The use of this type of apparatus has been proposed where a source for radiation of low frequency acoustical energy, i.e. of the range 50 Hz, to 2,000 Hz, is required in mobile vehicles such as acoustic counter measure and target vehicles. For these applications, a transducer apparatus having maximum dimensions of ten or twenty inches and a weight of less of 100 pounds is possible when this type of a construction is employed. Electroacoustic transducers employing acoustic resonant properties (as contrasted with flexure disc resonant properties) for this frequency range are massive, a typical one being dozens of feet in each dimension and weighing several tons.

Prior art double flexure disc transducer apparatuses of the type referred have the limitation of narrow bandwidth, due to the single resonant frequency of the flexure discs. One approach to overcoming the narrow bandwidth has been to use a plurality of transducer apparatuses, having the resonant frequencies of their respective discs spaced over the desired band. However, this produces an additional problem of greater weight. In addition, where the device is to be operated at any significant depth, a pressure equalizing system for maintaining the pressure within the chamber equal to ambient sea pressure is necessary, and the use of several transducers requires a significantly larger compensation system.

U.S. Pat. No. 3,510,698 to F. Massa is of interest. It discloses a double wall flexure type apparatus. Two circular vibratile walls are formed by machining away all but a thin wall in a solid cylindrical workpiece to form a cup-shaped element. Two such cup-shaped elements are put together rim-to-rim, forming an organization of two circular vibratile walls at opposite ends of a cylindrical chamber. Each circular vibratile wall is driven by two concentric piezoelectric laminar units consisting of a central circular unit and an annular band-shaped unit. The circular piezoelectric laminar unit and the annular unit of each wall are driven in opposite senses of radial strain. For example, when the circular unit drives the central region of the circular vibratile wall in compressive strain, the annular unit drives its outer annular region in tensile strain.

SUMMARY OF THE INVENTION

The subject of this invention is a double disc transducer of the type in which the discs are mounted at the ends of a cylindrical chamber containing acoustic mismatch fluid, and in which the discs are supported at their circumferential peripheries in a way enabling the discs to flex in the fundamental mode of disc flexure, i.e., with a flexing vibration node at the circumferential periphery of the disc and an antinode at its center. In accordance with the present invention, each disc is an assembly consisting of a non-active disc member having two or more concentric piezoelectric sandwich lamination units affixed thereto. Each sandwich unit is an arrangement of two piezoelectric laminar layers, one on each side of the central non-active member. Each laminar layer has associated electrodes which are connected to a pair of signal coupling terminals common to the layers on both sides of the non-active disc member. The piezoelectric laminar layers are piezoelectrically polarized, with the orientation of polarization and connection of electrodes such that opposite strains are produced on opposite sides of the disc in response to excitation of the coupling terminals with a given polarity of excitation signal. Radially outwardly cumulative conbinations of concentric piezoelectric sandwich units exhibit successively lower resonant frequencies of the fundamental flexure mode of discs. A series of bandpass filters having center frequencies corresponding to the successive resonance frequencies of the radially outwardly cumulative sets of concentric sandwich units is provided. The signal to be projected, which is typically a chromatic signal in the normal range of low frequency utilization of the transducer apparatus, namely 50–2,000 Hz, is applied to the piezoelectric sandwich units through an interconnecting network which applies only the frequency bands up to the highest resonant frequency for which the concentric sandwich unit is a part of the corresponding radially outwardly cumulative set. The electrical connection to the corresponding piezoelectric sandwich units of the two flexure disc assemblies is arranged to cause the strain differentials produced at the two flexure assemblies to cause the flexure disc assemblies to exhibit bilaterally opposite excursions of flexure disc assemblies relative to a reference plane parallel to the flexure disc assemblies and passing through the midpoint of the distance therebetween. Stated another way, when the antinode at the center of one flexure disc assembly is in its maximum deflection position extending outwardly into the sea water medium, the antinode at the center of the other flexure disc assembly is also at its maximum deflection position extending outwardly into the sea water medium. The resonance characteristics of the radially cumulative sets of piezoelectric sandwich units combine by superposition, providing wide bandwidth of operation and efficient transducer operation.

DESCRIPTION OF THE PREFERRED EMBODIMENT

Figure 1:
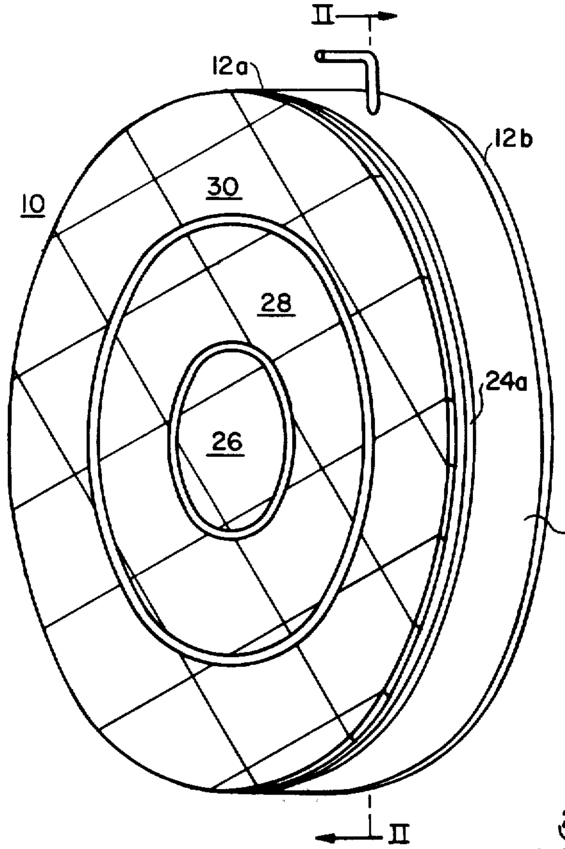
FIG. 1 is a perspective view of improved double flexure disc electro-acoustic transducer apparatus in accordance with the present invention.
Figure 2:
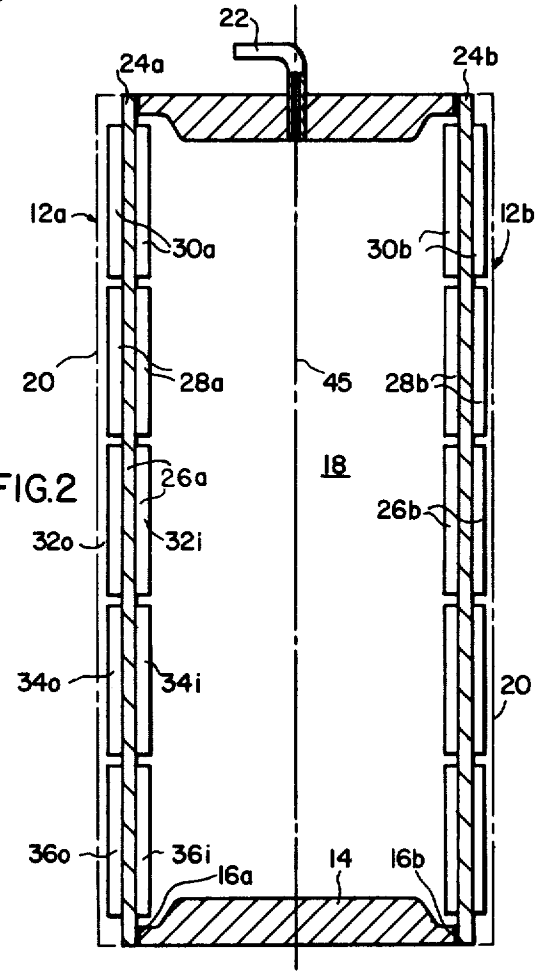
FIG. 2 is a section of the transducer apparatus of FIG. 1 taken along lines II—II of FIG. 1.

Referring now to the drawing and in particular to FIGS. 1 and 2, an electro-acoustical transducer apparatus, in accordance with the present invention, comprises piezoelectrically driven flexure disc assemblies 12a and 12b, and a ring-like wall member 14. The detailed description of flexure disc assemblies 12a and 12b will be the subject of a later paragraph. Discs 12a and 12b are affixed to the ends of ring-like wall member 14 by cemented joints 16a and 16b, (FIG. 2 only) respectively attaching a circumferentially peripheral portion of the respective disc assembly to the confronting annular end face of member 14. This forms a fluid-tight chamber 18 which contains air or nitrogen, or any other suitable fluid chosen to provide an acoustical impedance mismatch relative to the acoustical impedance characteristics of the flexure disc assemblies. The construction and arrangement of the ring-like wall member 14 is such that the structural support provided to the circumferential portion of disc assemblies 12a and 12b affords a sufficient degree of compliance in the radial direction of the disc assemblies, but with sufficient stiffness in the axial direction of the disc assemblies to enable the disc assemblies to vibrate in the fundamental mode of disc flexure vibration. The fundamental mode is the mode of disc flexing wherein the circumferential portion exhibits nodal flexing vibration characteristics and the center of the disc exhibits antinodal flexing vibration characteristics, with the balance of the disc having displacements in phase with the antinodal displacement of its center. Techniques of design of wall members 14 to provide these radial compliance and axial stiffness characteristics are well known. The cross-section of member 14 as shown in the drawing constitutes one such construction. More details of this construction are described at page 10, lines 6–14 of the earlier cited Patent Application Ser. No. 506,658. Other suitable constructions are described in the earlier cited publication of R. S. Woollett at page 58 therein. A thin layer of acoustically transparent insulation material 20, shown by dotted lines in FIG. 2 only, is cast over the outer faces of disc assemblies 12a and 12b. One suitable material is polyurethane. Chamber 18 has a tube 22 extending through wall member 14 for connection to pressure equalization equipment (not shown) in order to enable apparatus 10 to be submersed to significant ocean depths without the development of damaging differential pressure across the piezoelectrically driven flexure disc assemblies. Such pressure equalizing equipment may be either of the type including a reservoir of high pressure fluid which is introduced into chamber 18 under control of regulator and relief valves, or of the type in which the fluid is exposed to ambient sea pressure in some diaphragm or bladder structure which transmits the ambient sea pressure to the inside of the chamber. Although a chamber 18 has been described as filled with a gaseous fluid medium, suitable acoustic impedance mismatch liquids, such as castor oil or silicone, may be used just as well.

Reference is again made to FIGS. 1 and 2, this time for a detailed description of the construction of the piezoelectrically driven flexure disc assemblies 12a and 12b. Assemblies 12a and 12b are essentially identical and therefore only assembly 12a will be described. Assembly 12a has a central disc member 24a made of a material, such as aluminum, chosen to optimize the mechanical "Q" characteristic of flexing vibration of the assembly. The combination of characteristics of aluminum which provide the optimum "Q" are its tensile strength, and a bulk modulus close to that of water. Central disk members 24a, 24b are radially continuous members. Affixed to central disc member 24 are three piezoelectric sandwich units constituting separate electromechanical strain translating means. These consist of a circular inner piezoelectric sandwich unit 26a and intermediate annular band-shaped sandwich unit 28a, and an outer annular band-shaped sandwich unit 30a. Each unit is composed of two piezoelectric laminar elements of the corresponding shape, i.e., circular, annular band, and annular band, which are affixed to the opposite faces of central member 24 in juxtapositioned relationship, so they form a sandwich structure with the central member. These are the circular-shaped outer and inner laminar layers 32o, and 32i, annular band-shaped piezoelectric laminar layers 34o, 34i, and the annular band-shaped piezoelectric laminar layers 36o 36i. The layers 32o, 32i, 34o, 34i, 36o and 36i have electroded surfaces (not shown) and are formed of conventional square slabs of piezoelectric ceramic material which have been shaped by machining to form a mosaic of the desired concentric shapes. The electroded surfaces of all the square slab fragments forming each of the concentrically shaped layers are connected in electrical parallel (not shown). The segmentation dividing adjacent square slabs and slab fragments is of the order of ⅛ of an inch, or 0.3 centimeters. The employment of square ceramic slabs is the conventional state-of-art method of fabricating piezoelectric sandwich units. The slab materials of which the sandwich units are constructed have conventional predetermined polarization characteristics such that electrical excitement across their thickness dimension causes a predetermined sign of strain in the plane of the slab. Each sandwich unit receives its excitation through a common pair of terminals, and the arrangement of polarity of the slab and the connection for application of the excitation signal thereacross is such that an excitation signal of a given polarity causes opposite signs of strain in the inner and outer layers. The arrangement producing these opposite senses of strain is the same for each of sandwich units 26*a*, 28*a*, and 30*a*, so that an A. C. voltage applied in excitation of the three units will cooperate with the axial stiffness and radial compliance provided by annular wall 14 to cause assembly 12*a* to vibrate in the fundamental mode of disc flexure. Note that this is different from the operation disclosed in U.S. Pat. No. 3,510,698 discussed in the preamble. The arrangement of piezoelectric laminar layer polarities and electrical connections to produce such opposite strains is the same as present in the constructions of flexure discs for the prior art two-disc resonant disc vibration transducers. A typical radial distance of separation of adjacent piezoelectric laminar layers among the sandwich units is 0.01 inch, or 0.02 centimeters.

Figures 3, 9:
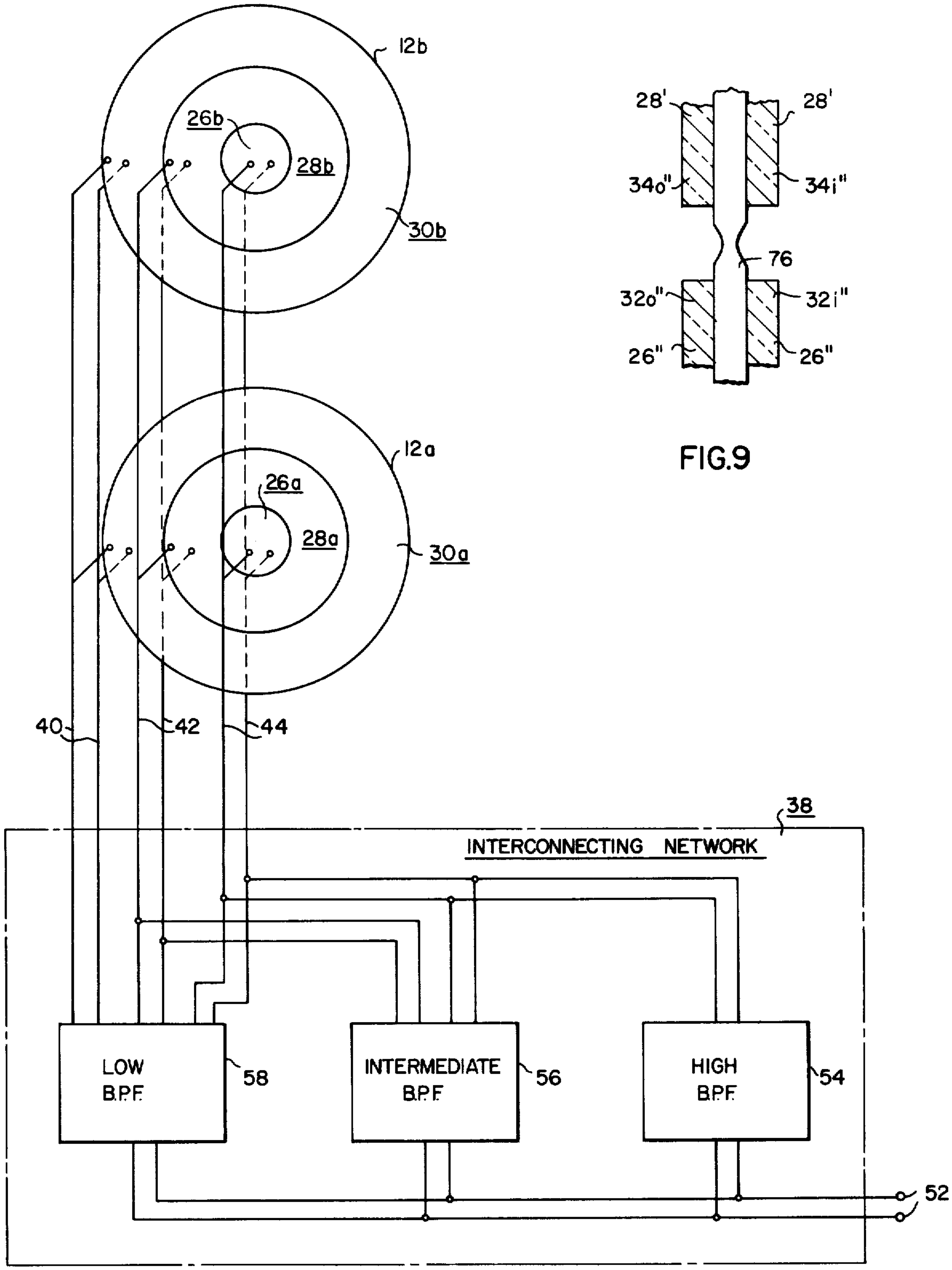
FIG. 3 is an electrical schematic, showing a series of band-pass filters and a network which operatively interconnects the band-pass filters with the two flexure disc assemblies.
FIG. 9 is a cross-sectional detail of a modified form of flexure disc assembly.

Flexure disc assembly 12*b* has corresponding sandwich units 26*b*, 28*b*, and 30*b*. Referring now to FIG. 3 the excitation signal for the sandwich units of the two disc assemblies is processed through an interconnecting network 38 containing band-pass filters. The detail structure and function of network 38 will be described later herein. For present purposes it will be understood that the outputs of network 38 emanate from a low frequency mode pair of leads 40, and intermediate frequency mode pair of leads 42, and a high frequency mode pair of leads 44. Leads 40 constitute the excitation feed to outer sandwich unit pair 30*a*, 30*b*; leads 42 the feed for intermediate sandwich unit pair 28*a*, 28*b*; and leads 44 the feed for central sandwich unit pair 26*a*, 26*b*. The arrangement of electrical connection of each pair of leads to the operatively associated sandwich unit pair is such that a given polarity of excitation signal will cause the respective sandwich units to produce strain couples causing the vibratory excursions of the flexure disc assemblies to have bilateral symmetry relative to a reference plane phantom line 45, FIG. 2, parallel to the deenergized positions of the disc assemblies and passing through the midpoint of the distance therebetween. Stated another way, the arrangement of electrical connection is such that the vibration of disc assemblies 12*a* and 12*b* cause the volume displacement between the disc assemblies due to the respective disc assemblies to be in phase, i.e., when the antinode at the center of disc 12*a* is at its maximum outward excursion, the antinode at disc 12*b* will also be at its maximum outward excursion position. The arrangement of electrical connections to produce such bilaterally symmetrical strains is the same as present in the prior art two-disc resonant disc vibration transducers.

Figure 5:
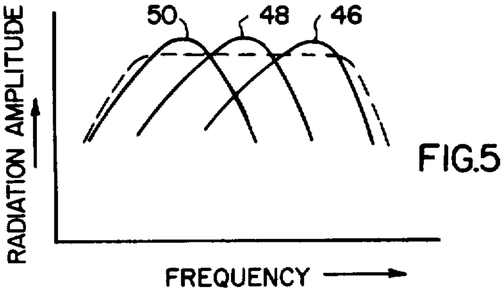
FIG. 5 is a graph containing curves used in explaining the multi-mode operation of the apparatus of FIG. 1.
Figure 4A:
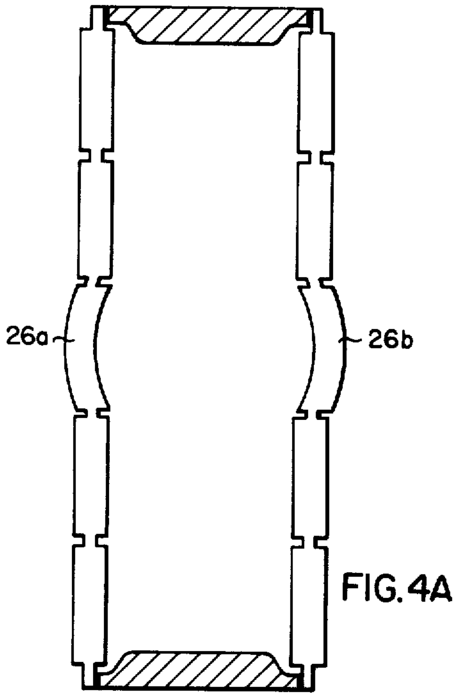
FIGS. 4A, 4B, and 4C are diagrams used in explaining the multi-mode operation of the flexure discs of the apparatus of FIG. 1.
Figure 4B:
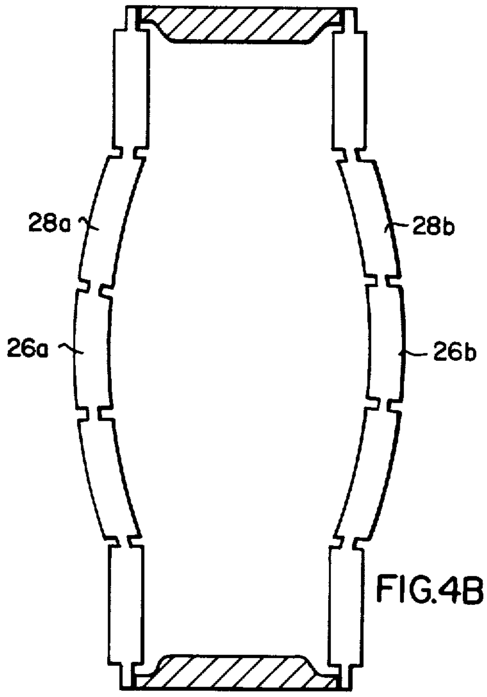
Figure 4C:
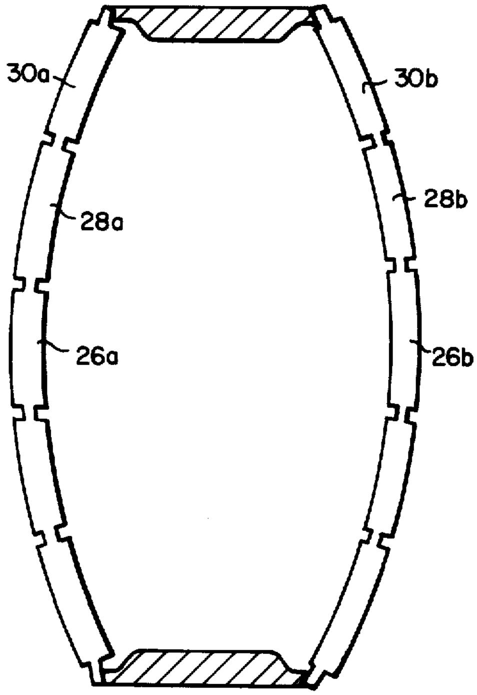

Referring now to FIGS. 4 and 5, the construction of flexure disc assemblies 12*a* and 12*b* with the three concentric piezoelectric sandwich units, gives apparatus 10 three modes of resonant disc flexure corresponding to three radially outwardly cumulative combinations of the sandwich units. The first mode of disc flexing operation, illustrated in FIG. 4A, corresponds to resonant flexing of circular inner sandwich units 26*a* and 26*b*, only. The second mode of disc flexure, illustrated by FIG. 4B corresponds to the resonant flexing of the combination sandwich units 26*a*, 28*a* and 26*b*, 28*b*. The third mode of disc flexure operation corresponds to the flexing vibration of the combination of all pairs of sandwich units, namely 26*a*, 28*b* and 30*a*, and 26*b*, 28*b* and 30*b*. A specific equation for determining the resonant frequency in water ($f_{rw}$) of a disc with only one face radiating is disclosed in the previously cited copending Application Ser. No. 506,658 at page 12, line 23-25 therein, and other equations for calculating such resonant frequency are disclosed in the previously cited publication by Woollett. It will be apparent from the equations that the resonant frequency of a disc decreases as its radius increases. Therefore, the three modes of operation illustrated in FIGS. 4A, 4B and 4C have corresponding flexure resonance characteristic of curves 46, 48 and 50.

Referring again to FIG. 3 the input for the excitation signal to apparatus 10 is a pair of signal coupling terminals 52 of interconnecting network 38. Network 38 includes high, intermediate, and low frequency band-pass filters 54, 56 and 58, which respectively have center of band frequencies corresponding to the center frequency of curves 46, 48 and 50. Network 38 channels portions of the frequency spectral components of the signal applied to input terminals 52 to the radially outwardly cumulative combinations of sandwich unit pairs as follows. The outputs of all band-pass filters are applied to the circular inner sandwich unit pairs 26*a*, 26*b*. The output of intermediate and low band-pass filters 56 and 58 are applied to the intermediate sandwich unit pair 28*a*, 28*b*. The output of only the low band-pass filter 58 is applied to sandwich unit pair 30*a*, 30*b*. It will be appreciated that the upper frequency limit of spectral components applied to the individual sandwich unit pairs varies in an inverse relationship to the radial distance of the sandwich pair from the center of the central disk member to which the sandwich pair is affixed. Stated another way, if the sandwich unit pairs are designated by a reference sequence starting with the radially outermost sandwich unit pair and the band-pass filters 58, 56 and 54, in that order, are likewise given the same reference sequence, the interconnecting network will apply the outputs of only the corresponding and prior band-pass filters to the corresponding sequence of sandwich unit pairs. Thus the outer sandwich unit pair 30*a* is restricted to excitation by only the output from low band-pass filter 58; intermediate sandwich unit pair 28*a*, 28*b* restricted to outputs of intermediate and low band-pass filters 56 and 58; and central sandwich unit pair 26*a*, 26*b* receives the output of all band pass filters. It will be appreciated that interconnecting network 38 constitutes a means for energizing the individual concentric piezoelectric sandwich unit pairs such that each electro-mechanical strain translating means is energized by an A.C. signal including only frequency spectral components up to an upper frequency limit which corresponds to the frequency of disc vibration resonance for a disc having a radial expanse equal to the outside radius of the respective concentric piezoelectric sandwich unit. A typical form of excitation signal applied to input terminal 52 is a chromatic A.C. signal rich in a random distribution of frequency components in the desired range of operations of apparatus 10. As previously noted, an example of such desired range of operation is 50-2,000 Hz. However, alternate forms of excitation signals include a plurality of monotone A.C. signals, or even a single monotone A.C. signal, depending solely on what signal is desired to be radiated into the water.

Figure 6:
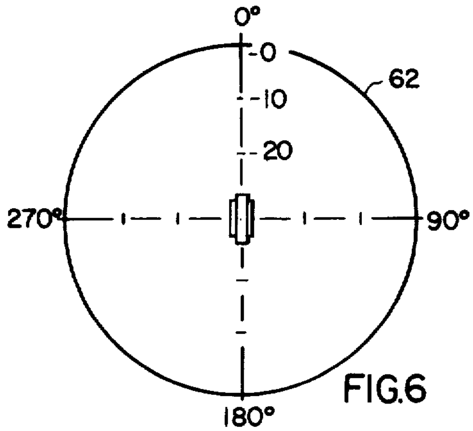
FIG. 6 is a diagram illustrating the directional characteristics of acoustic propagation of the apparatus of FIG. 1.

In operation, the radially cumulative sets of sandwich unit pairs corresponding to the previously described three modes of flexure are each simultaneously excited by the appropriate portion of the spectrum of input to cause resonant flexing in the respective modes of operation. The resonant peaks associated with each of the modes are combined by superposition yielding as a resulting dashed line combined resonant characteristic curve 60, FIG. 5. Referring now to FIG. 6, the previously described volume displacement "in-phase" relationship of vibration of flexure discs 12*a* and 12*b* provide the omnidirectional beam pattern, line 62, in the manner analogous to "in-phase" displacements of a dipole radiator.

Figure 7:
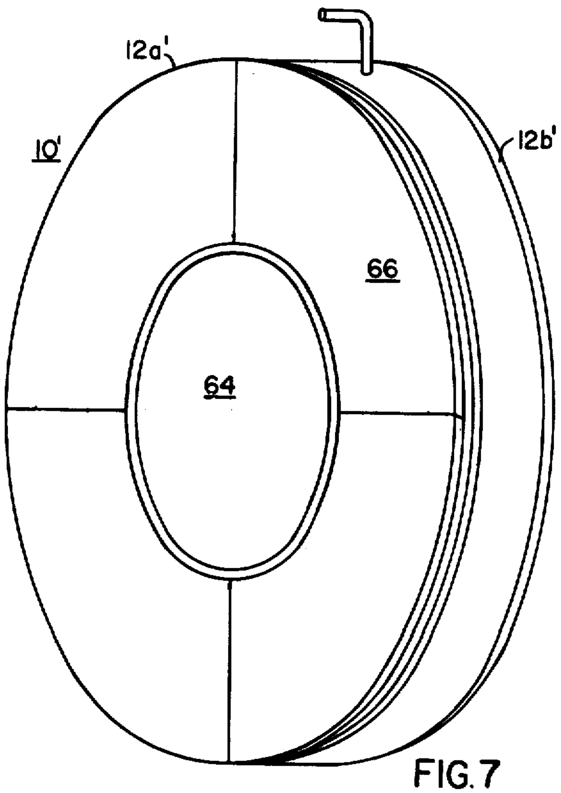
FIG. 7 is a perspective view of transducer apparatus like that of FIG. 1 which was used in an experiment which corroborated the principles of the present invention.
Figure 8A:
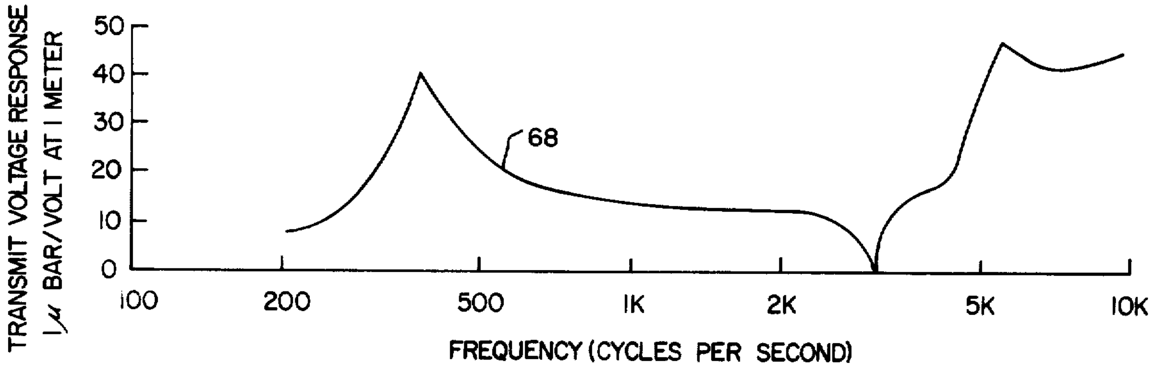
FIGS. 8A, 8B, and 8C, are a family of curves depicting results of the experiments conducted with the device of FIG. 6.
Figure 8B:
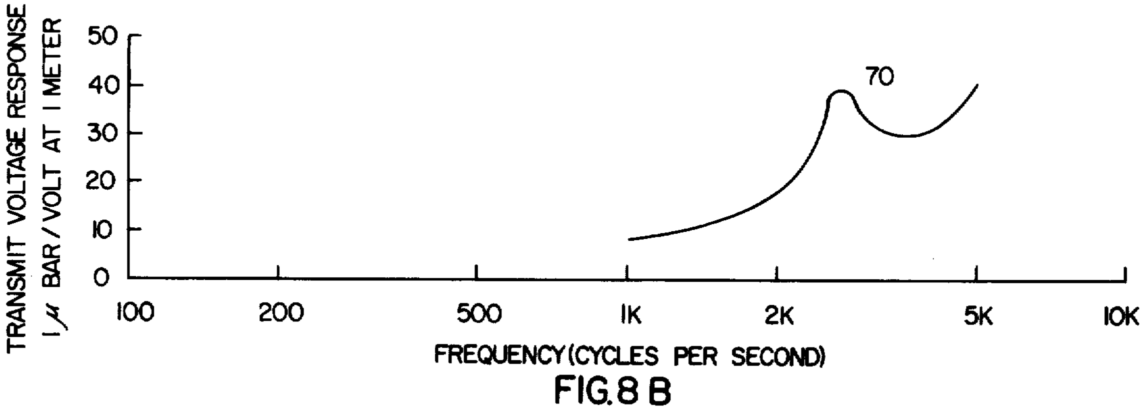
Figure 8C:
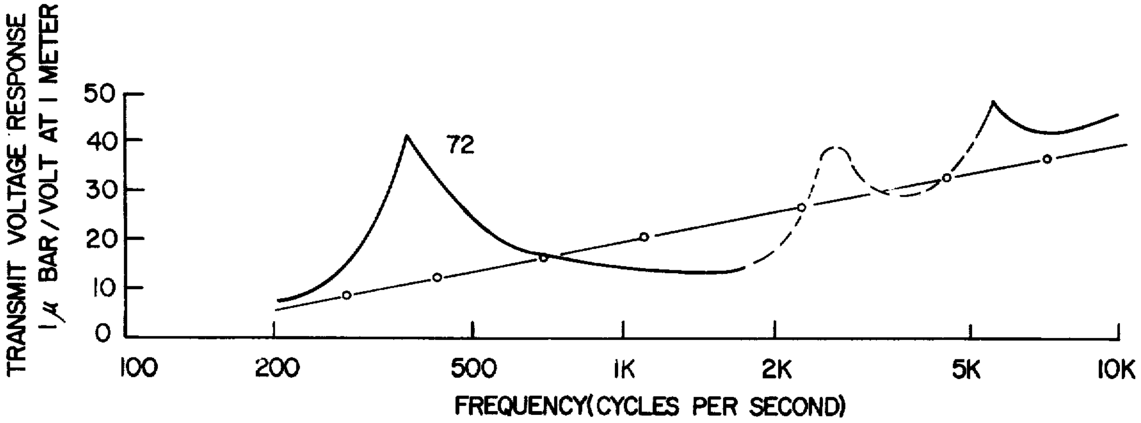

Reference is now made to FIGS. 7 and 8 in order to describe an experiment which corroborated the principles of multi-mode resonant disc characteristics of apparatus 10. Transducer apparatus 10' was constructed, in accordance with the previous teachings, but in design detail has two, rather than three piezoelectric sandwich units. These two sandwich units consist of a central circular sandwich unit 64 having a 4 inch diameter, and an annular band sandwich unit 66 having a radial width of two inches. The total diameter of the flexure discs 12*a*', 12*b*' is 8 inches. Annular sandwich unit 66 is made of slabs of piezoelectric material shaped as quadrature sectors of the annular band, rather than the square-shaped slabs of the embodiment of FIG. 1. FIG. 8A shows a spectrum of the transmit voltage response of apparatus 10 when driven in the underwater environment by a wave analyzer, commercially available from Hewlitt-Packard and designated by Catalog No. HP3590. The spectrum was swept by a pure tone of one cycle bandwidth, with a constant input voltage. As indicated by curve 68 the driving of both sandwich units 64 and 66 results in two resonant peaks with an anti-resonance between them. Curve 70, FIG. 8B, was obtained by driving only the 4-inch inner sandwich unit 64 in the same manner. Here resonance occurs at 2.7 KHz. The partially solid and the partially dotted line curve 72 of FIG. 8C is a hypothetical curve of expected frequency response when an interconnecting network, as previously described, is used to cut off the drive to annular sandwich unit 66 above 1.6 KHz and below 5 KHz. It will be appreciated by those skilled in the art that increasing the size of central piezoelectric sandwich unit 64, will cause the second resonant peak on curve 72 to move closer to the first resonant peak. Also, by increasing the number of annular sandwich units, the valleys in curve 72 will tend to be filled-in.

A further experiment with apparatus 10' was conducted by placing sand on a vibrating flexure disc assembly face under vibration at various frequencies in the range of frequency responses which are of interest. The sand piles up at nodes and moves away from high velocity areas providing so-called "Chladni patterns". In the case of driving both piezoelectric sandwich units 64 and 66 at 3 KHz, a null in flexure vibration was indicated at a circular loci having a diameter of 4 inches. This suggests that the positions of the disc on either side of the null are out of phase, which would account for the anti-resonance indicated in curve 68, FIG. 8A.

It will be appreciated that the present invention effectively combines two or more pairs of flexural disc assemblies into a single unit, and thus simplifies the weight and compensating problem associated with the prior art attempt to provide broad band transducer by using a plurality of transducer apparatuses having their respective resonance frequencies spaced over the desired band.

FIG. 9 illustrates a modified form of construction of a piezoelectrically driven flexure disc assembly 12". It is an enlarged cross-section of a portion of the flexure disc assembly encompassing marginal portions of the piezoelectric laminar layers 32*o*" and 32" of a radially inwardly disposed piezoelectric sandwich unit 26" and laminar layers 34*o*" and 34" of a radially intermediate sandwich unit 28". The metal, non-active central disc member 76 at the circular loci thereof between the adjacent laminar units is weakened by V-shaped grooves in both its faces to enhance the multimode characteristics of the assembly. The same effect can be obtained by a "U" shaped groove or other combinations of shapes and metal treatments to provide weakening at such loci.

Although the invention has been illustrated by an embodiment in which the pieozelectric sandwich units are of a trilaminar configuration, similar results could be obtained by other configurations of laminations such as bilaminar or multilaminar sandwich units.

Although the invention has been illustrated by a two-disc resonant disc vibration transducer, it will be appreciated that the principle of the multi-nodal operation of the flexure disc would operate in other configurations of resonant disc vibration transducers such as the configuration of single flexure discs mounted in a housing having only one open end.

I claim:

1. Underwater electro-acoustical transducer apparatus, comprising:

first and second electro-mechanical flexure discs including a radially continuous disc member and a series of concentric electro-mechanical strain translating means affixed to said radially continuous disc member at various radial distances from its center;

annular spacer means for supporting said first and second electro-mechanical flexure discs in parallel spaced relationshp; and means for selectively energizing the concentric electro-mechanical strain translating means with predetermined alternating current signal frequency spectral components, wherein the upper frequency limit of the frequency spectral components varies in inverse relation to the radical distance of the electro-mechanical strain translating means from the center of the radially continuous disc member.

2. Apparatus in accordance with claim 1, wherein the upper frequency limit of the frequency spectral components which energize the respective electro-mechanical strain translating means corresponds to the vibration resonance frequency for a flexure disc having a radial expanse substantially equal to the outer radial dimension of the respective electro-mechanical strain translating means from the center of the radially continuous disc member.

3. Apparatus in accordance with claim 2, wherein said series of concentric electro-mechanical strain translating means are ordered in a sequence starting with the radially outermost electromechanical strain translating means and ending with the innermost electro-mechanical strain translating means; and wherein said selective energizing means includes an input coupling for receiving the alternating current signal which is the energizing input for the electro-acoustical transducer apparatus;

a series of bandpass filters having respective predetermined center frequencies that increase monotonically for selectively energizing members of the series of the electro-mechanical strain translating means; and an interconnecting means for connecting said input coupling and each concentric electromechanical strain translating means of each flexure disc through only corresponding and prior filters of the series of band-pass filters.

4. Apparatus in accordance with claim 1, wherein said annular spacer means is so constructed and arranged to support the circumferential portions of the first and second electro-mechanical flexure discs in such manner that the degree of compliance of radial support is greater than the degree of compliance of axial support.

5. For use in underwater electro-acoustical transducer apparatus of the type having at least one active surface formed of an electro-mechanical flexure disc, the combination comprising:

a radially continuous disc member;

a series of concentric electro-mechanical strain translating means affixed to said radially continuous disc member at various radial distances from its center; and means for selectively energizing the individual concentric electro-mechanical strain translating means with predetermined alternating current signal frequency spectral components, the upper frequency limit of the spectral components which energize the respective electro-mechanical strain translating means varying in an inverse relation to the radial distance of the electro-mechanical strain translating means from the center of the radially continuous disc.

6. Apparatus in accordance with claim 5, wherein said series of concentric electro-mechanical strain translating means are ordered in a sequence starting with the radially outermost electro-mechanical strain translating means and ending with the innermost electro-mechanical strain translating means; and wherein said selective energizing means includes an input coupling for receiving the alternating current signal which is the energization input for the electro-acoustical transducer apparatus;

a series of band-pass filters having respective predetermined center frequencies that increase monotonically for selectively energizing members of the series of the electro-mechanical strain translating means; and an interconnecting network means for connecting said input coupling and each individual electro-mechanical strain translating means through only corresponding prior filters of the series of band-pass filters.

7. For use in underwater electro-acoustical transducer apparatus of the type having at least one active surface formed of an electro-mechanical flexure disc, the combination comprising:

a radially continuous disc member, said radially continuous disc member being weakened at concentric loci interposed between adjacent concentric electro-mechanical translating means;

a series of concentric electro-mechanical strain translating means affixed to said radially continuous disc member at various radial distances from its center; and means for selectively energizing the concentric electro-mechanical strain translating means with predetermined alternatng current signal frequency spectral components, wherein the upper frequency limit of the frequency spectral components varies in inverse relation to the radial distance of the electro-mechanical strain translating means from the center of the radially continuous disc member.

8. Apparatus in accordance with claim 7, wherein said concentric electro-mechanical strain translating means each comprises first and second lamina of piezoelectric material affixed to one and the other of the opposite sides of said radially continuous disc member in axially juxtaposed relationship to one another.

9. Underwater electro-acoustical transducer apparatus comprising:

first and second electro-mechanical flexure discs including a radially continuous disc member and a series of concentric electro-mechanical strain translating means affixed to said radially continuous disc member at various radial distances from its center, said electro-mechanical strain translating means each comprising first and second lamina of piezoelectric material affixed to one and the other of opposite sides of said continuous disc member in axially juxtaposed relationship to one another;

annular spacer means for supporting said first and second electro-mechanical flexure discs in parallel spaced relation by support contact along their respective circumferential portions, said annular spacer means providing a degree of compliance of radial support which is greater than the degree of compliance of axial support to enable the flexure discs to vibrate in a predetermined flexure mode characterized by their circumferential portions exhibiting nodal flexing vibration characteristics and their centers exhibiting antinodal flexing characteristics; and means for energizing the first and second lamina of piezoelectric material of each concentric electro-mechanical strain translating means of both electro-mechanical flexure discs to produce opposite senses of strain at opposite sides of the respective radially continuous disc member with all of the lamina of piezoelectric material affixed to each respective side of a radially continuous member producing the same sense of strain, said energizing means selectively energizing the lamina of piezoelectric material of each concentric electro-mechanical strain translating means with predetermined alternating current signal frequency spectral components, the upper frequency limit of the frequency spectral components which energize the respective electro-mechanical strain translating means varying in an inverse relation to the radial distance of the electro-mechanical strain translating means from the center of the radially continuous disc member.

* * * * *